(12) United States Patent
Wilcox

(10) Patent No.: US 6,203,042 B1
(45) Date of Patent: Mar. 20, 2001

(54) BICYCLE REAR SUSPENSION SYSTEM PROVIDING RELATIVE REARWARD MOTION OF REAR AXLE

(75) Inventor: Weston M. Wilcox, Sun Prairie, WI (US)

(73) Assignee: Trek Bicycle Corporation, Waterloo, WI (US)

( * ) Notice: Subject to any disclaimer, the term of this patent is extended or adjusted under 35 U.S.C. 154(b) by 0 days.

(21) Appl. No.: 09/246,439

(22) Filed: Feb. 8, 1999

Related U.S. Application Data
(60) Provisional application No. 60/075,427, filed on Feb. 20, 1998.

(51) Int. Cl.⁷ ............................. B62K 25/04; B62K 25/30
(52) U.S. Cl. ........................... 280/284; 280/275; 280/283
(58) Field of Search ................................ 280/284, 286, 280/275, 283, 285, 281.1

(56) References Cited

U.S. PATENT DOCUMENTS

| | | | |
|---|---|---|---|
| D. 364,365 | 11/1995 | Lin et al. ............................. | D12/111 |
| D. 368,880 | 4/1996 | Harrington ........................... | D12/117 |
| 739,237 | 9/1903 | Travis . | |
| 1,130,828 | 3/1915 | Kuehn . | |
| 1,412,012 | 4/1922 | Bruno . | |
| 2,132,317 | 10/1938 | Pease ................................... | 280/284 |
| 2,283,671 | 5/1942 | Finlay et al. ......................... | 280/284 |
| 2,446,731 | 8/1948 | Wheler ................................. | 280/284 |
| 3,907,332 | 9/1975 | Richardson .......................... | 280/285 |
| 3,942,821 | 3/1976 | Bock .................................... | 280/277 |
| 3,948,543 | 4/1976 | MacDonald et al. ................. | 280/284 |
| 3,982,770 | 9/1976 | Satoh et al. .......................... | 280/284 |
| 4,039,200 | 8/1977 | McGonegle .......................... | 280/284 |
| 4,046,396 | 9/1977 | Taylor et al. .................... | 280/281 R |
| 4,058,181 | 11/1977 | Buell ..................................... | 180/32 |
| 4,147,370 | 4/1979 | Lindsey, Jr. .......................... | 280/234 |
| 4,170,369 | 10/1979 | Strutman .............................. | 280/261 |
| 4,265,329 | 5/1981 | de Cortanze ......................... | 180/219 |

(List continued on next page.)

FOREIGN PATENT DOCUMENTS

| | | | |
|---|---|---|---|
| 497.017 | 2/1919 | (FR) ...................................... | 280/284 |
| 923.235 | 10/1947 | (FR) ...................................... | 280/284 |
| 2 395 879 | 7/1977 | (FR) .............................. | B62K/11/02 |
| 2395-879 | 3/1979 | (FR) . | |
| 17336 | 10/1913 | (GB) ..................................... | 280/284 |
| 24918 | 9/1918 | (GB) ..................................... | 280/284 |
| WO 89/09718 | 10/1989 | (GB) .............................. | B62K/25/00 |
| 421518 | 3/1947 | (IT) . | |
| 423515 | 7/1947 | (IT) ....................................... | 280/284 |
| 540821 | 3/1956 | (IT) ....................................... | 280/284 |

OTHER PUBLICATIONS

Simultaneous submission: U.S. Utility Patent Application for Variable Reduction Cross–Linkage for Rear Suspension Bicycle, Wilcox.

*Primary Examiner*—Lanna Mai
*Assistant Examiner*—Hau Phan
(74) *Attorney, Agent, or Firm*—Boyle Fredrickson Newholm Stein & Gratz S.C.; James F. Boyle

(57) ABSTRACT

A bicycle rear suspension system providing rearward relative motion of the rear axle includes a chain stay, seat stay, chain stay link, seat stay link and shock absorber, with those components being assembled to a main front frame. The frame includes a head tube for supporting a front steering fork, a seat tube for supporting a seat, and a bottom bracket for supporting a pedal crank and chain drive mechanism, the seat tube and bottom bracket being supported so that there is a vertical space between them. The components of the rear suspension system are assembled to the frame within the space between the seat tube and bottom bracket. The chain stay link is pivotally attached to the frame so that, upon upward movement of the chain stay, the chain stay link pivots to cause the chain stay and thus the rear axle supported thereon to move slightly rearwardly relative to the frame.

16 Claims, 4 Drawing Sheets

U.S. PATENT DOCUMENTS

| | | | |
|---|---|---|---|
| 4,303,256 | 12/1981 | Mortensen | 280/261 |
| 4,327,930 | 5/1982 | Tominaga et al. | 280/284 |
| 4,421,337 | 12/1983 | Pratt | 280/277 |
| 4,433,850 | 2/1984 | Miyakoshi et al. | 280/277 |
| 4,576,393 | 3/1986 | Moulton et al. | 280/276 |
| 4,582,343 | 4/1986 | Waugh | 280/284 |
| 4,679,811 | 7/1987 | Shuler | 280/284 |
| 4,789,174 | 12/1988 | Lawwill | 280/284 |
| 4,792,150 | 12/1988 | Groendal et al. | 280/275 |
| 4,856,801 | 8/1989 | Hollingsworth | 280/284 |
| 4,997,197 | 3/1991 | Shultz | 280/275 |
| 5,000,470 | 3/1991 | Kamler et al. | 280/275 |
| 5,014,808 | 5/1991 | Savard et al. | 180/219 |
| 5,121,937 | 6/1992 | Lawwill | 280/284 |
| 5,205,572 | 4/1993 | Buell et al. | 280/284 |
| 5,211,415 | 5/1993 | Gasiorowski | 280/281.1 |
| 5,217,241 | 6/1993 | Girvin | 280/284 |
| 5,226,674 | 7/1993 | Buell et al. | 280/284 |
| 5,244,224 | 9/1993 | Busby | 280/284 |
| 5,259,637 | 11/1993 | Busby | 280/284 |
| 5,269,552 | 12/1993 | Yelverton | 280/283 |
| 5,295,702 | 3/1994 | Buell | 280/284 |
| 5,306,036 | 4/1994 | Busby | 280/284 |
| 5,308,030 | 5/1994 | Bales | 248/214 |
| 5,316,327 | 5/1994 | Bell | 280/260 |
| 5,332,246 | 7/1994 | Buell | 280/284 |
| 5,335,929 | 8/1994 | Takagaki et al. | 280/283 |
| 5,356,165 | 10/1994 | Kulhawik et al. | 280/275 |
| 5,405,159 | 4/1995 | Klein et al. | 280/283 |
| 5,409,248 | 4/1995 | Williams | 280/284 |
| 5,409,249 | 4/1995 | Busby | 280/284 |
| 5,415,423 | 5/1995 | Allsop et al. | 280/281.1 |
| 5,435,584 | 7/1995 | Buell | 280/284 |
| 5,441,292 | 8/1995 | Busby | 280/284 |
| 5,452,910 | 9/1995 | Harris | 280/284 |
| 5,460,396 | 10/1995 | Sutter et al. | 280/284 |
| 5,474,318 | 12/1995 | Castellano | 280/284 |
| 5,487,497 | 1/1996 | Kwiatkowski | 224/41 |
| 5,489,139 | 2/1996 | McFarland | 297/195.1 |
| 5,498,014 | 3/1996 | Kulhawik et al. | 280/284 |
| 5,509,679 | 4/1996 | Leitner | 280/283 |
| 5,553,881 | 9/1996 | Klassen et al. | 280/284 |
| 5,570,896 | 11/1996 | Collins | 280/284 |
| 5,611,557 * | 3/1997 | Farris et al. | 280/284 |
| 5,628,524 | 5/1997 | Klassen et al. | 280/284 |
| 5,658,001 | 8/1997 | Blanchard | 280/276 |
| 5,678,837 | 10/1997 | Leitner | 280/284 |
| 5,685,553 | 11/1997 | Wilcox et al. | 280/283 |
| 5,704,626 | 1/1998 | Kesinger | 280/220 |
| 5,725,227 | 3/1998 | Mayer | 280/284 |
| 5,749,590 | 5/1998 | Roerig | 280/276 |
| 5,762,353 | 6/1998 | Miller | 280/284 |
| 5,762,354 | 6/1998 | Brummer | 280/284 |
| 5,772,048 | 6/1998 | Sopcisak | 211/20 |
| 5,772,227 | 6/1998 | Michail | 280/275 |
| 5,772,228 | 6/1998 | Owyang | 280/284 |
| 5,785,339 | 7/1998 | Mamiya et al. | 280/283 |
| 5,791,674 | 8/1998 | D'Aluisio et al. | 280/284 |
| 5,813,683 | 9/1998 | Kulhawik et al. | 280/275 |
| 5,826,899 | 10/1998 | Klein et al. | 280/284 |
| 5,833,255 | 11/1998 | Sarder et al. | 280/220 |
| 5,842,711 | 12/1998 | Legerot | 280/281.1 |
| 5,860,665 * | 1/1999 | Giles | 280/284 |
| 5,899,480 | 5/1999 | Leitner | 280/284 |
| 5,901,974 | 5/1999 | Busby et al. | 280/284 |
| 5,909,890 | 6/1999 | Sachs et al. | 280/284 |
| 5,911,428 | 6/1999 | Ueda et al. | 280/276 |

\* cited by examiner

BICYCLE REAR SUSPENSION SYSTEM PROVIDING RELATIVE REARWARD MOTION OF REAR AXLE

RELATED APPLICATIONS

The present application claims priority based on a provisional application, Serial No. 60/075,427 filed by the same applicant under the same title on Feb. 20, 1998.

BACKGROUND OF THE INVENTION

1. Field of the Invention

The present invention relates to a bicycle rear suspension system which provides an upward and slightly rearward motion of the rear axle relative to the frame. In other words, in comparison to a typical "swing arm" suspension of the type commonly used on rear suspension bicycles wherein the suspension operates so that the rear axle moves upwardly and slightly forwardly relative to the frame, the rear suspension system of the present invention instead moves the rear axle upwardly and slightly rearwardly relative to the frame. The relative rearward motion of the rear axle provides greater clearance and ease in traveling over obstructions.

2. Background of the Related Art

The primary structural component of a conventional two-wheel bicycle is the frame. On a conventional road bicycle, the frame is typically constructed from a set of tubular members assembled together to form the frame. For many bicycles, the frame is constructed from members commonly referred to as the top tube, down tube, seat tube, seat stays and chain stays, and those members are joined together at intersections commonly referred to as the head tube, seat post, bottom bracket and rear dropout. The top tube usually extends from the head tube rearwardly to the seat tube. The head tube, sometimes referred to as the neck, is a short tubular structural member at the upper forward portion of the bicycle which supports the front steering fork, which has the front wheel on it, and the handlebar. The down tube usually extends downwardly and rearwardly from the head tube to the bottom bracket, the bottom bracket usually comprising a cylindrical support member for the pedals and chain drive mechanism which powers the bicycle. The seat tube usually extends from the bottom bracket upwardly to where it is joined to the rear end of the top tube. The seat tube also usually functions to telescopically receive a seat post for supporting a seat or saddle for the bicycle rider to sit on. The chain stays normally extend rearwardly from the bottom bracket, and the seat stays normally extend downwardly and rearwardly from the top of the seat tube, the chain stays and seat stays being joined together with a rear dropout for supporting the rear axle of the rear wheel. The portion of the frame defined by the head tube, seat post and bottom bracket and the structural members that join those three items together can be referred to as the main front triangular portion of the frame, with the seat stays and chain stays defining a back triangular portion of the frame. The foregoing description represents the construction of a conventional bicycle frame which of course does not possess a suspension having any shock absorbing characteristics.

The increased popularity in recent years of off-road cycling, particularly on mountains and cross-country, has made a shock absorbing system in many instances a biking necessity. A bicycle with a properly designed suspension system is capable of traveling over extremely bumpy, uneven terrain and up or down very steep inclines. Suspension bicycles are less punishing, reduce fatigue and reduce the likelihood of injury to the rider, and are much more comfortable to ride. For off-road cycling in particular, a suspension system greatly increases the rider's ability to control the bicycle because the wheels remain in contact with the ground as they ride over rocks and bumps in the terrain instead of being bounced into the air as occurs on unsuspended conventional bicycles.

Over the last several years the number of bicycles now equipped with suspension systems has dramatically increased. In fact, many bicycles are now fully suspended, meaning that the bicycle has both a front suspension and a rear suspension. Front suspensions were the first to become popular. Designed to increase the rider's steering control by removing the pounding to the bicycle front end, the front suspension is simpler to implement than a rear suspension and a front suspension steering fork is easy to retrofit onto an older model bicycle. On the other hand, a rear suspension will increase traction, assist in cornering and balance the ride. Riding a fully suspended mountain bike down a rough, rock strewn trail, or even level riding on city and country roads, provides a new degree of safety and comfort to the rider. It is in downhill riding and racing that a rear suspension is most beneficial, but even on ordinary city and country roads, a rear suspension allows the rider to look forward more safely to view traffic and road conditions without paying disproportionate attention to stones and potholes immediately below.

A number of pivoting "swing arm" suspensions have been developed for rear wheel suspensions on bicycles. In its simplest configuration, the chain stays, which on a conventional bicycle frame are rigidly mounted, are replaced by a pair of swing arms that are pivotally attached at their front ends to the main front triangular portion of the frame. The rear ends of the swing arms, which carry the rear wheel, move upward and downward in response to the rear wheel striking rocks, curbs and other obstructions. The range of movement of the swing arm usually is controlled by a shock absorber affixed between the swing arm and the main front frame.

An example of one highly successful full suspension bicycle is disclosed in the applicant's own U.S. Pat. No. 5,685,553, which relates to a rear suspension for a bicycle having a Y-shaped frame. Like many other fully suspended bicycles, the rear suspension system disclosed in the applicant's '553 patent is comprised of a main front frame, a rear swing arm (which in the '553 patent is described as a unified rear triangle), and a shock absorber. The swing arm pivots about a single pivot point on the frame, and the shock absorber, which is attached to both the frame and also to the rear swing arm, controls its movement. When the rear wheel hits, for instance, a rock, the swing arm pivots upwardly to allow the wheel to travel over the obstruction. The movement of the rear axle is of course dependent on the pivotal movement of the swing arm. Therefore, as the swing arm pivots upwardly about the main pivot point on the frame, the rear axle must necessarily move in an arc, which means that the rear axle moves upwardly and also slightly forwardly. FIG. 5 schematically illustrates the arcuate path of the rear axle on a common single pivot swing arm rear suspension system. This forward movement of the rear axle relative to the frame, even if it is only a small amount, causes the rear wheel to become "hung up" on an obstruction and to momentarily jerk the bicycle rearwardly until the rear wheel clears the obstruction.

Like all other fields of industry, the bicycle industry as a whole and bicycle racing in particular is extremely competitive, resulting in an evolution of many different designs for rear suspensions. Bicycle designers have tried to optimize the performance of the rear suspension system by, among other things, moving the pivot point of the swing arm. Such rear suspension designs can be generally categorized into one of three categories: the low pivot, the high pivot and the multiple pivot. For example, U.S. Pat. No. 5,217,241 (Girvin) discloses a low pivot rear suspension. Here, a single pivot is located relatively close to the line of the top of the run of the chain, slightly above the bottom bracket. In contrast, the high pivot rear suspension generally has the pivot position relatively high above the chain and front derailer. Multiple pivot rear suspensions commonly employ the use of one or more additional components which function nothing more than to redirect the force of the shock absorbers so that it may be placed in a novel location. Multiple pivot rear suspension systems are illustrated for example in U.S. Pat. No. 5,226,674 (Buell) and U.S. Pat. No. 5,244,224 (Busby).

In virtually all such designs the arcuate motion of the swing arm results in a less than fully effective suspension motion of the rear axle and rear wheel relative to the frame. Accordingly, an improved rear suspension system for a bicycle is desired.

SUMMARY OF THE INVENTION

An improved bicycle rear suspension system is disclosed. The present invention includes a novel suspension means for moving the rear axle not merely upward but also slightly rearwardly relative to the frame to provide greater clearance and ease in travelling over obstructions.

The frame for the rear suspension bicycle disclosed herein is essentially composed of what is considered the front triangular portion of the bicycle which includes a head tube at the upper forward portion of the frame, the head tube supporting a handlebar and a steering fork with a front wheel thereon, a seat tube at the upper rearward portion of the frame for supporting a seat, and a bottom bracket at the lower portion of the frame for supporting a pedaling mechanism. The rear suspension itself is comprised of a novel combination of rear suspension components, namely, the chain stays, and seat stays, a shock absorber, a chain stay pivot link and a seat stay pivot link.

The chain stay is an elongated structural member which extends from a point near the bottom bracket rearwardly to the rear axle. The seat stay, which is above the chain stays, likewise extends rearwardly to the rear axle, the rearward portions seat stay and chain stay being fixed relative to each other. The forward portions of the chain stay is connected to the frame with the chain stay pivot link, and the forward portion of the seat stay is connected to the frame with a seat stay pivot link. Movement of the rear suspension system is controlled with the shock absorber, which is attached to the frame and to the chain stay pivot link. The above-mentioned components are arranged in a manner such that, when the rear wheel of the bicycle strikes an obstruction, the rear axle moves in an upward direction over the obstruction. Additionally, in the present invention, by virtue of the chain stay being assembled to the frame via the chain stay pivot link, as the rear axle moves upward it also moves in a slightly rearward direction relative to the frame of the bicycle. This upward and rearward movement of the rear axle allows the rear wheel to ride over the obstruction in a smoother fashion than previously experienced on prior art bicycle suspension systems.

Other objects and advantages of the present invention will become apparent from the following description which sets forth, by way of illustration and example, certain preferred embodiments of the present invention.

DETAILED DESCRIPTION OF THE PREFERRED EMBODIMENT

Figure 1:
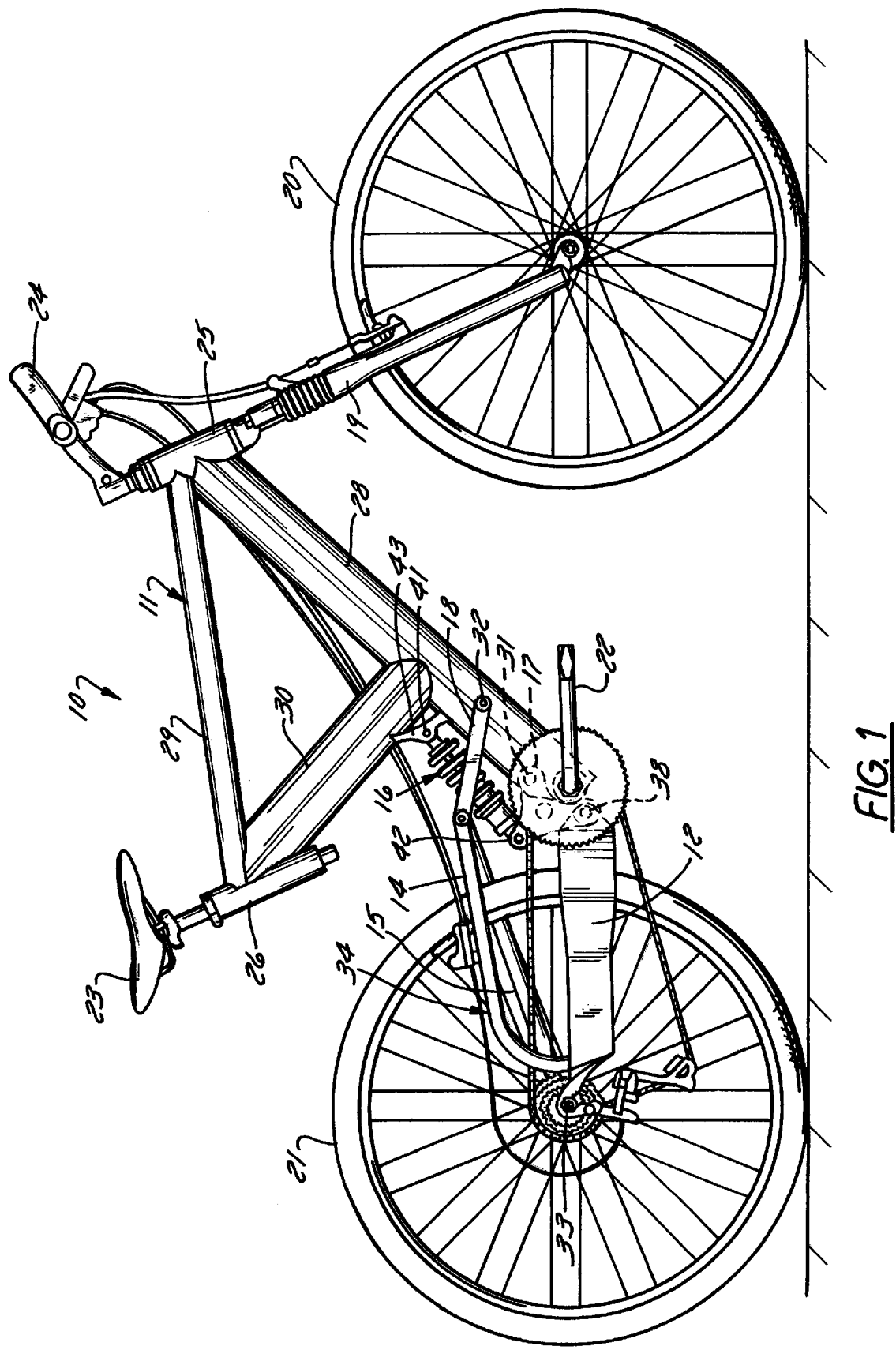
FIG. 1 is a side elevation view of a bicycle which includes a rear suspension system which provides a rearward relative motion of the rear axle in accordance with the principles of the present invention.
Figures 4, 5:
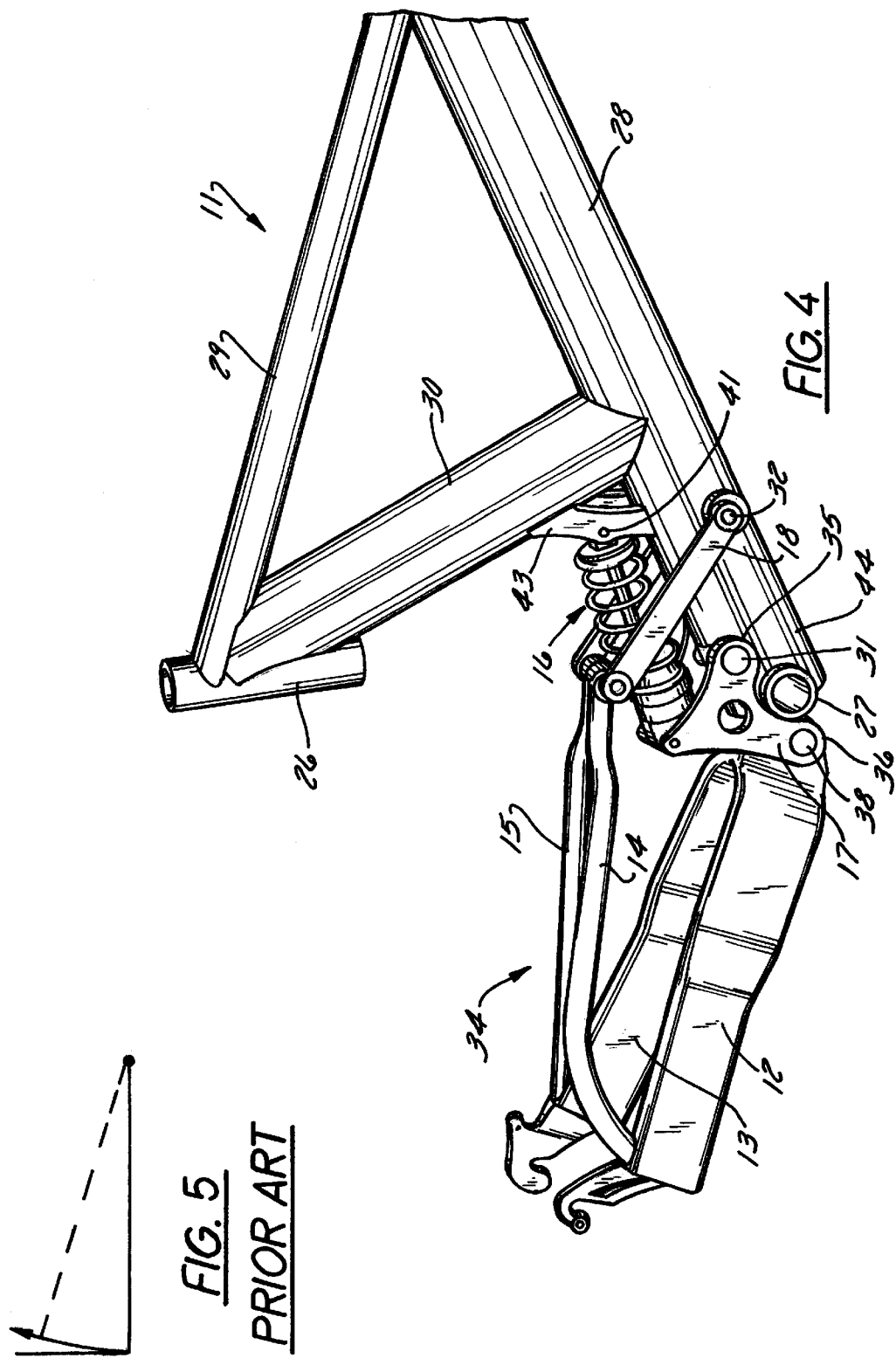
FIG. 4 is a perspective view of the rear suspension system.
FIG. 5 is a schematic illustration of the forward relative movement of the rear axle on a prior art single pivot swing arm rear suspension.

The invention disclosed herein is directed to a rear suspension bicycle 10 which includes a means for providing the rear axle with an upward and slightly rearward suspension motion relative to the frame. Referring to FIGS. 1 and 4 in particular, the primary components of the rear suspension bicycle disclosed herein include a bicycle frame 11, a pair of chain stays 12 and 13, a pair of seat stays 14 and 15, a shock absorber 16, a chain stay pivot link 17, and a seat stay pivot link 18. Additional components for the bicycle, such as a front steering fork 19, front wheel 20, rear wheel 21, pedals 22, seat 23, handlebar 24, and so forth, are commonly known and are similarly disclosed in, for example, applicant's U.S. Pat. No. 5,685,533.

The frame 11 is essentially comprised of what has been previously described as the main front triangular frame member. Specifically, the frame 11 in this instance includes a head tube 25 at the upper forward portion of the frame, a seat tube 26 at the upper rearward portion of the frame, and a bottom bracket 27 at the lower portion of the frame. The head tube 25 of course supports the steering fork 19, on which the front wheel 20 is attached, and supports the handlebar 24 for steering the bicycle. The seat tube 26 is used for adjustably supporting a seat 23, sometimes referred to as a saddle. The bottom bracket 27 supports the pedals 22 and chain drive mechanism for powering the bicycle.

The head tube 25, seat tube 26 and bottom bracket 27 are supported relative to each other by frame members which for the particular frame configuration shown in FIGS. 1–4 include a down tube 28, a top tube 29, and a third tube 30 which will be referred to in this particular application as a seat support tube. The head tube 25 and bottom bracket 27 are rigidly supported to each other via the down tube 28 which extends from the head tube 25 downwardly and rearwardly to the bottom bracket 27. The seat tube 26 is supported by the top tube 29 which extends generally rearwardly from the head tube 25 to the seat tube 26. The seat tube 26 is also supported by the seat support tube 30. The seat support tube 30 intersects an intermediate portion of the down tube 25, and it extends upwardly and rearwardly and is joined together to the rear portion of the top tube 27 to support the seat post. The frame 11 is preferably constructed to have a vertical space between the seat tube 26 and the bottom bracket 27. The vertical space permits the assembly and free movement of various components of the rear suspension system discussed below.

Of course, there are other possible configurations and ways to describe the main front frame. For instance, the frame may be alternatively described in the terminology used to describe the Y-shaped frame disclosed in applicant's prior U.S. Pat. No. 5,685,553. In doing so, the frame in this case is thus comprised essentially of a head arm, a seat arm, and a down arm. The head arm extends forwardly and terminates at the head tube for supporting the steering fork and handlebars. The seat arm and down arm diverge rearwardly from the head arm and diverge from each other, with the seat arm extending rearwardly and terminating at the seat post, and the down arm extending downwardly and rearwardly and terminating at the bottom bracket. The seat arm and down arm converge at an intersection. The seat arm, head arm, and down arm form what is referred to herein as a generally Y-shaped frame.

In either case, the frame 11 for the present invention further includes a first pivot point 31 for the chain stay pivot link 17 and a second pivot point 32 for the seat stay pivot link 18. Preferably, the first pivot point 31 is located slightly forward and above the bottom bracket 27, and the second pivot point 32 is located above and forward of the first pivot point 31.

The chain stays 12 and 13 and seat stays 14 and 15 are generally tubular structural members which extend rearwardly from the frame to the rear axle 33. Of course, there are actually two chain stays 12 and 13 and two seat stays 14 and 15, one each on the right and left sides of the bicycle. The forward portion of the chain stays 12 and 13 are connected to the frame with the chain stay pivot link 17. The rearward portion of the right chain stay 12 is rigidly affixed to the rearward portion of the right seat stay 14 and likewise the rearward portion of the left chain stay 13 is rigidly affixed to the rearward portion of the left seat stay 15. The seat stays 14 and 15 extend from the rearward portion of the chain stays 12 and 13 upwardly and forwardly towards the frame. The forward portion of the seat stays 14 and 15 are connected to the frame with the seat stay pivot link 18. To increase lateral stability of the rear suspension system, the forward portion of the right chain stay 12 is preferably joined together to the forward portion of the left chain stay 13. Similarly, the forward portion of the right seat stay 14 is preferably joined to the forward portion of the left seat stay 15. Because the chain stays and seat stays operate cooperatively to support and control the suspension motion of the rear axle, for purposes of this disclosure the chain stays and seat stays may be referred to together jointly as the rear swing arm 34.

The chain stay pivot link 17, which may be alternatively referred to as a first link for the rear suspension system, is a linking member which connects the front portion of the chain stays 12 and 13 to the first pivot point 31 on the frame. The chain stay pivot link 17 may be generally described as a generally three-pronged, somewhat triangular-shaped member having three curved side edges and three rounded corners which define a first portion 35, a second portion 36, and a third portion 37 of the chain stay link 17. The first portion 35 is pivotally connected onto the first pivot point 31 on the frame, namely, the pivot point located immediately above and slightly forward of the bottom bracket 27. The second portion 36 of the chain stay link 17 is pivotally connected to the forward end of the chain stays 12 and 13. The side edge between the first portion 35 and second portion 36 of the chain stay link 17 is curved to generally conform to and abut against the rear side of the cylindrical bottom bracket 27. The pivot point where the second portion 36 of the chain stay link 17 is pivotally connected to the forward end of the chain stay defines a third pivot point 38 for the rear suspension system. The third pivot point 38 is preferably located downwardly and rearwardly of the first pivot point 31, and also preferably located downwardly and rearwardly from the bottom bracket 27 supporting the pedaling mechanism. The third portion 37 of the generally three-pronged chain stay pivot link 17 is pivotally connected to the shock absorber 16 (discussed further below).

The seat stay pivot link 18, which may be alternatively referred to as a second link for the rear suspension system, is an elongated support member having a first end 39 and a second end 40. The first end 39 of the seat stay pivot link 18 is pivotally connected to the second pivot point 32 on the frame, and the second end 40 of the seat stay link 18 is pivotally connected to the forward portion of the seat stays 14 and 15. The first end of the seat stay link is thus pivotally connected onto the frame at a point located above and forward of where the first portion 35 of the chain stay pivot link 17 is attached to the frame. The seat stay pivot link 18 extends from its pivot point on the frame rearwardly and slightly upwardly.

The shock absorber 16 is a component having a first end 41, second end 42, a spring, and a fluid dampening mechanism. The first end 41 of the shock absorber is pivotally attached to the frame, and, as mentioned, the second end 42 of the shock absorber is pivotally attached to the third portion 37 of the chain stay link 17. The first end 41 of the shock absorber 16 is preferably, though not necessarily, pivotally attached at or near a point where two structural members of the frame intersect. With respect to the particular frame configuration illustrated in FIGS. 1–4, the first end of the shock absorber is pivotally connected to a support brace 43 attached (e.g., welded) to the frame at the intersection of the down tube 28 and the seat support tube 30. As mentioned, the down tube 28 extends generally downwardly and rearwardly from the head tube 25 to the bottom bracket 27. Preferably, the shock absorber 16 likewise extends lengthwise from the first end 41 to the second end 42 in a generally downwardly and rearwardly direction above a lower portion 44 of the down tube 28. The primary components of the rear suspension system, namely, the shock absorber 16, chain stay pivot link 17, seat stay pivot link 18, and the forward portion of the seat stays 14 and 15 fit within the vertical space between the seat tube 26 and the bottom bracket 27.

Figure 2:
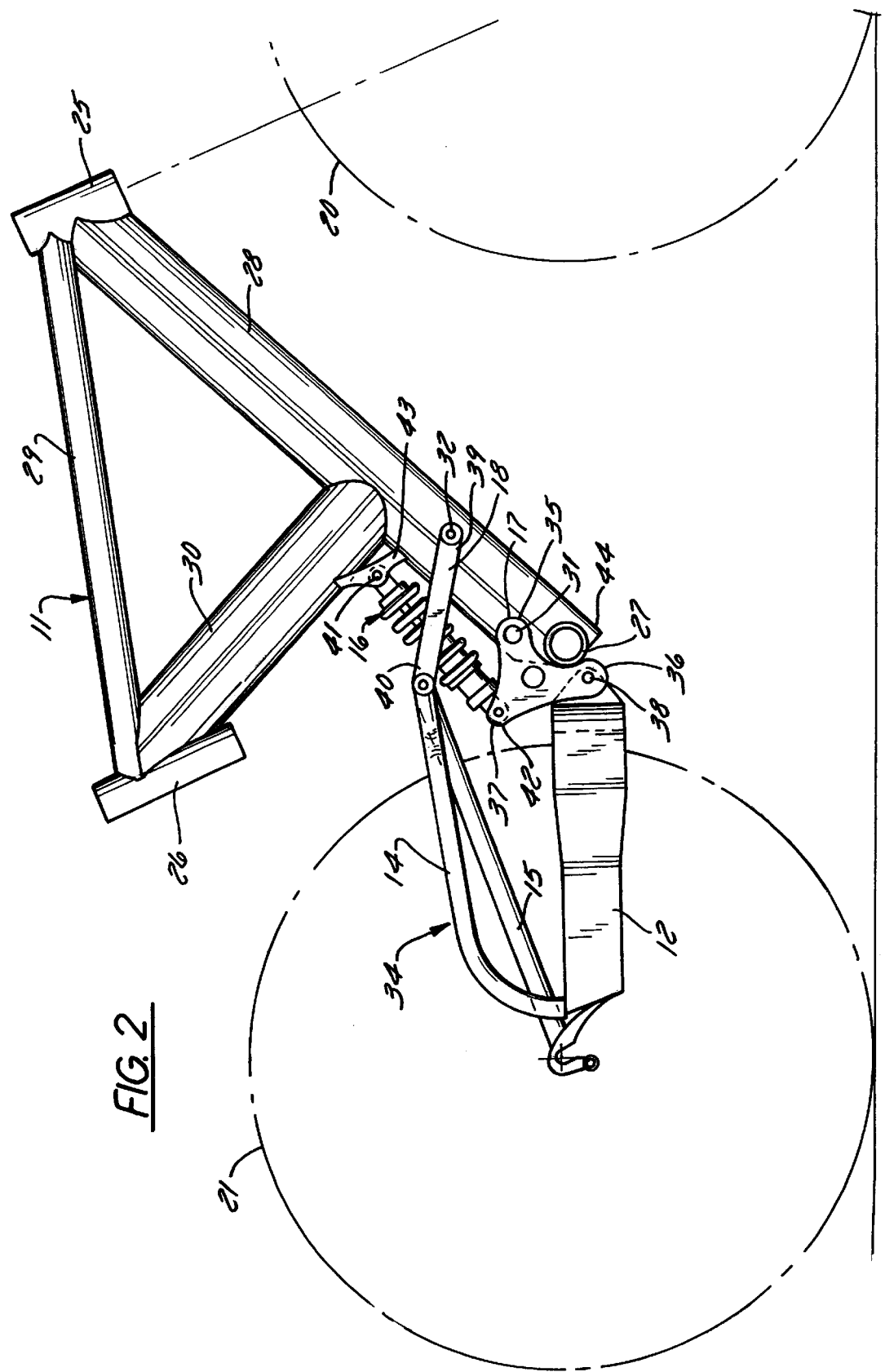
FIG. 2 is a side elevation view of the rear suspension system of the present invention shown in a substantially unloaded condition.
Figure 3:
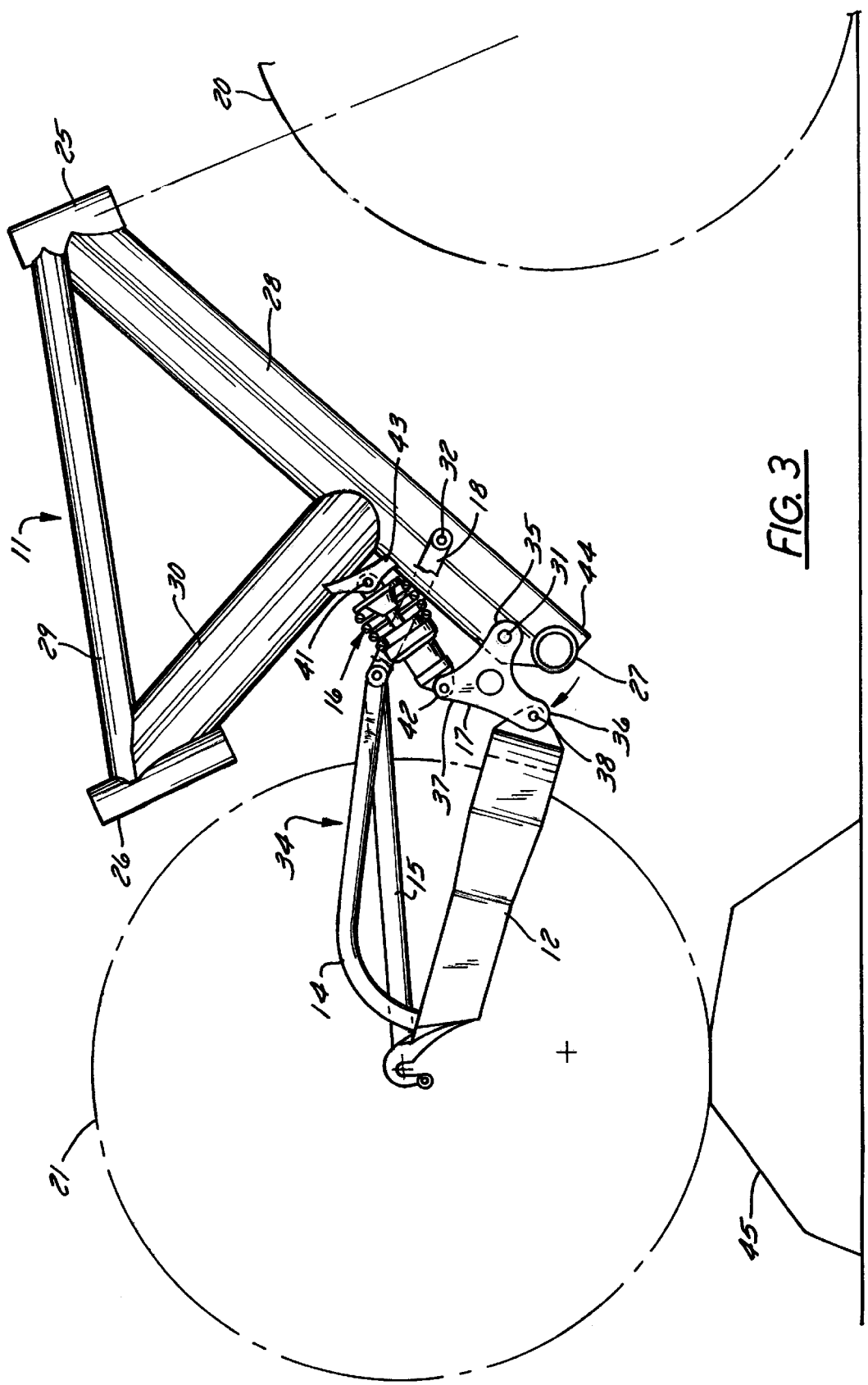
FIG. 3 is a side elevation view of the rear suspension system, partially in section, shown in the loaded condition, i.e., riding over an obstruction.

Referring in particular to FIGS. 2 and 3, the preferred embodiment of the invention described above operates in the following manner. When the rear wheel 21 of the bicycle 10 strikes an obstruction 45 (e.g., a large rock or curb), the rear axle 33 moves upwardly to allow the rear wheel to pass over the obstruction. To accomplish this, the chain stays 12 and 13 must move upwardly. When they do so, the chain stay pivot link 17 moves pivotally about the first pivot point 31 on the frame, which causes the second portion 36 of the chain stay pivot link 17 to rotate in an upward and rearward direction (i.e., in reference to FIGS. 2 and 3 the chain stay pivot link 17 rotates in a clockwise direction). This upward and rearward motion of the second portion 36 of the chain stay pivot link 17 in turn causes the chain stays 12 and 13, and thus the rear axle 33, to also move in a slightly rearward direction. Of course, the pivotal movement of the chain stay pivot link 17 likewise causes the third portion 37 of the chain stay pivot link 17 to rotate upwardly and forwardly towards the frame to compress the shock absorber 16. In any event, as the rear axle 33 moves upward, it also moves in a slightly rearward direction relative to the frame 11 of the bicycle. This combination of both an upward and rearward movement of the rear axle 33 relative to the frame 11 allows the rear wheel 21 to ride over the obstruction 45 in a smoother fashion than previously experienced on prior art suspension systems, and in particular in comparison to convention single pivot swing arm suspension systems.

Finally, the present invention has been described and illustrated with reference to a particular preferred embodiment, which naturally includes many details about the frame, the rear suspension components, pivot points and so forth. Of course, specific details of the preferred embodiment as described herein are not to be interpreted as limiting the scope of the invention, but are provided merely as a basis for the claims and for teaching one skilled in the art to variously practice and construct the present invention in any appropriate manner. Changes may be made in details of the construction of various components of the bicycle, without departing from the spirit of the invention especially as defined in the following claims.

What is claimed is:

1. A rear suspension bicycle comprising:

a frame, said frame comprising a head tube at an upper forward portion of the frame, said head tube supporting a handlebar and a steering fork with a front wheel thereon, a seat tube at an upper rearward portion of the frame for supporting a seat, and a bottom bracket at a lower portion of the frame for supporting a chain drive mechanism, said bicycle further comprising a rear suspension system for a rear wheel, said rear suspension system comprising a chain stay and a seat stay for supporting a rear axle for the rear wheel, a shock absorber, a first link and a second link;

said chain stay extending forwardly from the rear axle, said seat stay extending forwardly and upwardly from the rear axle, said chain stay and seat stay each having rearward portions rigidly supported relative to each other;

said first link having a first portion, a second portion and a third portion, said first portion being pivotally connected to the frame at a first pivot point located immediately above and slightly forward of the bottom bracket, said second portion being pivotally connected to a forward portion of the chain stay, and said third portion being pivotally connected to the shock absorber;

said second link comprising an elongated member having a first end pivotally connected to a second pivot point on the frame located above and forwardly of the first pivot point, and said second link also having a second end pivotally connected to a forward portion of the seat stay; and said shock absorber having a first connecting point pivotally connected to the frame and a second connecting point pivotally connected to the third portion of the first link;

wherein, when the rear wheel strikes an obstruction, the rear suspension operates to cause the rear axle to move upwardly and slightly rearwardly relative to the frame.

2. The rear suspension bicycle of claim 1, wherein the seat tube and bottom bracket are structurally supported relative to each other so that there is a vertical space between the seat tube and the bottom bracket.

3. The rear suspension bicycle of claim 2, wherein the shock absorber, first link, second link, and the forward portion of the seat stay are assembled to the frame within the vertical space between the seat tube and bottom bracket.

4. The rear suspension bicycle of claim 3, wherein the frame is further comprised of a down tube extending downwardly and rearwardly from the head tube to the bottom bracket, and the shock absorber extends lengthwise downwardly and rearwardly in a direction substantially parallel to and above a lower portion of the down tube.

5. The rear suspension bicycle of claim 1, wherein the point where the second portion of the first link is pivotally connected to the forward portion of the chain stay portion of the swing arm defines a third pivot point.

6. The rear suspension bicycle of claim 5, wherein the third pivot point is located slightly rearwardly and downwardly of the bottom bracket.

7. The rear suspension bicycle of claim 6 wherein the first link is pivotable about the first pivot point on the frame so that the third pivot point rotates upwardly and rearwardly relative to the frame.

8. The rear suspension bicycle of claim 7, wherein the point where the second link is pivotally connected to the forward portion of the seat stay defines a fourth pivot point.

9. The rear suspension bicycle of claim 8, wherein the second link is pivotable about the second pivot point so that the fourth pivot point rotates upwardly and forwardly relative to the frame.

10. The rear suspension bicycle comprising:

a frame, said frame comprising a head tube at an upper forward portion of said frame, said head tube supporting a handlebar and a steering fork with a front wheel thereon, a seat tube at an upper rearward portion of the frame for supporting a seat, and a bottom bracket at a lower portion of the frame for supporting a pedaling mechanism, said seat tube and said bottom bracket being supported relative to each other so that there is a vertical space between the seat tube and bottom bracket;

right and left chain stays extending forwardly from right and left rear dropouts, respectively, said rear dropouts supporting a rear axle for a rear wheel;

right and left seat stays extending forwardly and upwardly from rearward portions of the right and left chain stays, respectively;

a chain stay link, said chain stay link having a first portion pivotally connected to the frame, a second portion pivotally connected to forward portions of the chain stays, and a third portion pivotally connected to a shock absorber, said shock absorber having an opposite end also pivotally connected to the frame; and a seat stay link, said seat stay link having a first end pivotally connected to the frame and a second end pivotally connected to forward portions of the seat stays;

said chain stay link being pivotable about a first pivot point that is above and forward of the bottom bracket on the frame so that the second portion of the chain stay link rotates in a direction upwardly and rearwardly relative to the frame, which thereby causes the rear axle to also move in a direction upwardly and rearwardly relative to the frame.

11. The rear suspension bicycle of claim 10, wherein the shock absorber, chain stay link, seat stay link and forward portions of the seat stays are assembled to the frame within the space between the seat tube and bottom bracket.

12. A rear suspension bicycle of claim 10, wherein rearward portions of the right and left chain stays are rigidly affixed to rearward portions of the right and left seat stays, respectively.

13. The rear suspension bicycle of claim 10, wherein the seat stay link is pivotable about a second pivot point on the frame, said second pivot point being above and forward of the first pivot point.

14. The rear suspension bicycle of claim 13 wherein the seat stay link pivots about the second pivot point so that the forward portions of the seat stays move upwardly and forwardly.

15. The rear suspension bicycle of claim 10, wherein the frame includes a down tube which extends upwardly and forwardly from the bottom bracket to the head tube, and the shock absorber extends from the chain stay link upwardly and forwardly above a lower portion of the down tube.

16. The rear suspension bicycle of claim 10, wherein the forward portions of the right and left seat stays are joined together, and the forward portions of the right and left chain stays are joined together.

\* \* \* \* \*